US006741168B2

(12) United States Patent
Webb et al.

(10) Patent No.: US 6,741,168 B2
(45) Date of Patent: May 25, 2004

(54) METHOD AND APPARATUS FOR AUTOMATED COLLECTION AND TRANSFER OF COLLISION INFORMATION

(75) Inventors: Ronald J. Webb, Plano, TX (US); Sudhindra P. Herle, Plano, TX (US)

(73) Assignee: Samsung Electronics Co., Ltd., Suwon (KR)

( * ) Notice: Subject to any disclaimer, the term of this patent is extended or adjusted under 35 U.S.C. 154(b) by 49 days.

(21) Appl. No.: 10/020,640

(22) Filed: Dec. 13, 2001

(65) Prior Publication Data

US 2003/0112133 A1 Jun. 19, 2003

(51) Int. Cl.[7] .................................................. B60Q 1/00

(52) U.S. Cl. .................... 340/436; 340/539.1; 340/903; 340/904; 340/425.5; 340/825.36; 340/825.49; 180/271; 180/274; 701/29; 701/30

(58) Field of Search .............................. 340/436, 539.1, 340/903, 904, 425.5, 825.36, 825.49; 180/271, 274; 701/29, 30

(56) References Cited

U.S. PATENT DOCUMENTS 4,945,532 A * 7/1990 Hald .......................... 370/245
5,267,237 A * 11/1993 Townley ..................... 370/445
6,212,568 B1 * 4/2001 Miller et al. ................ 709/236
6,266,617 B1 * 7/2001 Evans ........................ 701/301
6,353,874 B1 * 3/2002 Morein ....................... 711/118
6,525,672 B2 * 2/2003 Chainer et al. ............. 340/904

* cited by examiner

*Primary Examiner*—Daniel J. Wu
*Assistant Examiner*—Tai T. Nguyen

(57) ABSTRACT

A device within an automobile comprises or includes a wireless communications controller which, upon detection of impact, attempts to establish a wireless communications link to each of any counterpart wireless communications controllers which are within vehicles also subject to a recent impact, and therefore presumably involved in the collision. Vehicle identification information and information collected regarding the collision, such as vehicle speed, location, direction of travel, impact direction and magnitude, point of impact, etc., are automatically exchanged between vehicles involved in the collision and may be later retrieved from either vehicle, preserving objective information for accident reconstruction by police and insurance companies.

20 Claims, 3 Drawing Sheets

METHOD AND APPARATUS FOR AUTOMATED COLLECTION AND TRANSFER OF COLLISION INFORMATION

TECHNICAL FIELD OF THE INVENTION

The present invention is directed, in general, to accident-related systems in automobiles and, more specifically, to automatic collection of collision or accident information in collision detection and recording systems which communicate wirelessly with other vehicles and the like.

BACKGROUND OF THE INVENTION

Resolution of automobile collision disputes currently depends largely on eyewitness and/or participant testimony, which often proves biased or inaccurate. Accident reconstruction techniques based on physical evidence such as skid marks and impact damage are expensive and time consuming, and are also inherently at least as uncertain as the initial assumptions which are made and the accuracy of any measurements or estimates. Moreover, investigations based on information gathered after the fact will inherently be less reliable than information collected at or about the time of an accident. Upon detecting a collision (e.g., by deployment of an airbag), most current vehicles designs will, at most, simply summon assistance.

In another aspect of automotive design, some vehicles are currently equipped with internal memory devices storing repair histories, but such devices typically require a direct, hardwired connection to the memory and the memories are subject to tampering or other input of false data.

There is, therefore, a need in the art for accurate and tamper-proof system for collecting objective collision related information for automatic communication to appropriate entities.

SUMMARY OF THE INVENTION

To address the above-discussed deficiencies of the prior art, it is a primary object of the present invention to provide, for use in an automobile, a collision recorder which comprises or includes a wireless communications controller. Upon detection of impact, the wireless communications controller attempts to establish a wireless communications link to each of any counterpart wireless communications controllers which are within the vicinity of impact. Vehicles within the closest proximity are presumably also involved in the collision. Vehicle identification information and information collected regarding the collision, such as vehicle speed, location, direction of travel, impact direction and magnitude, point of impact, etc., are automatically exchanged between vehicles involved in the collision and may be later retrieved from either vehicle, preserving objective collision information for accident reconstruction by police and insurance companies.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art will appreciate that they may readily use the conception and the specific embodiment disclosed as a basis for modifying or designing other structures for carrying out the same purposes of the present invention. Those skilled in the art will also realize that such equivalent constructions do not depart from the spirit and scope of the invention in its broadest form.

Before undertaking the DETAILED DESCRIPTION OF THE INVENTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

Figure 1:
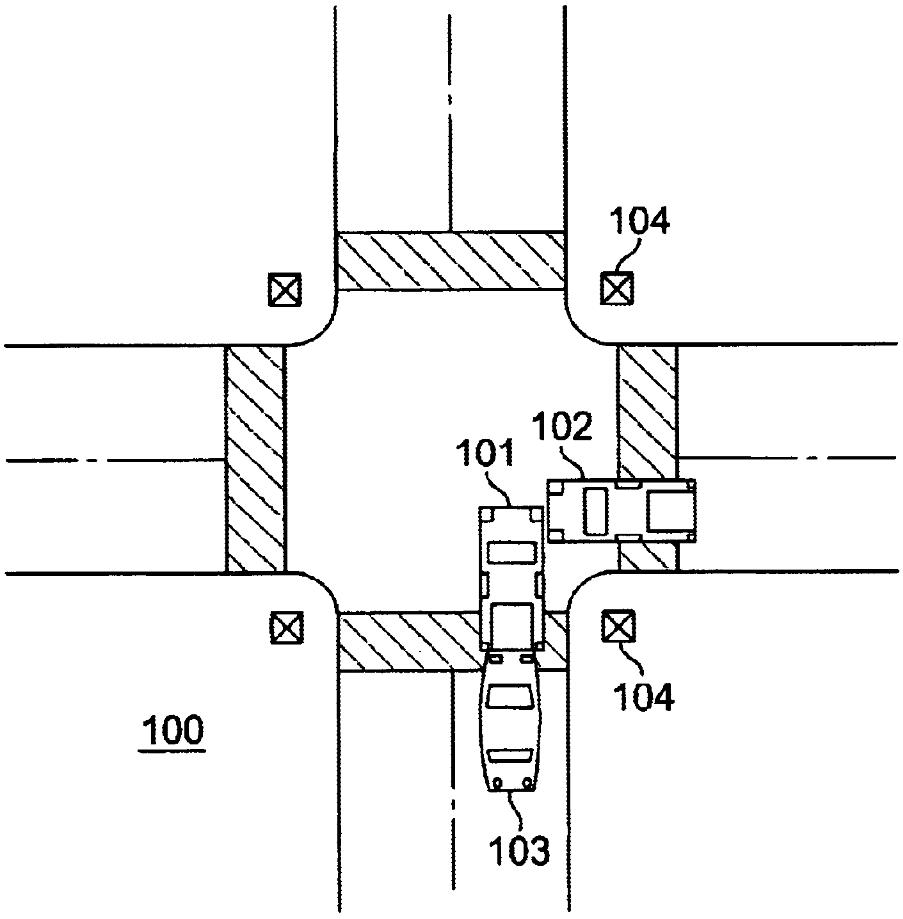
FIG. 1 depicts a wireless collision information collection and transfer system according to one embodiment of the present invention.
Figure 2:
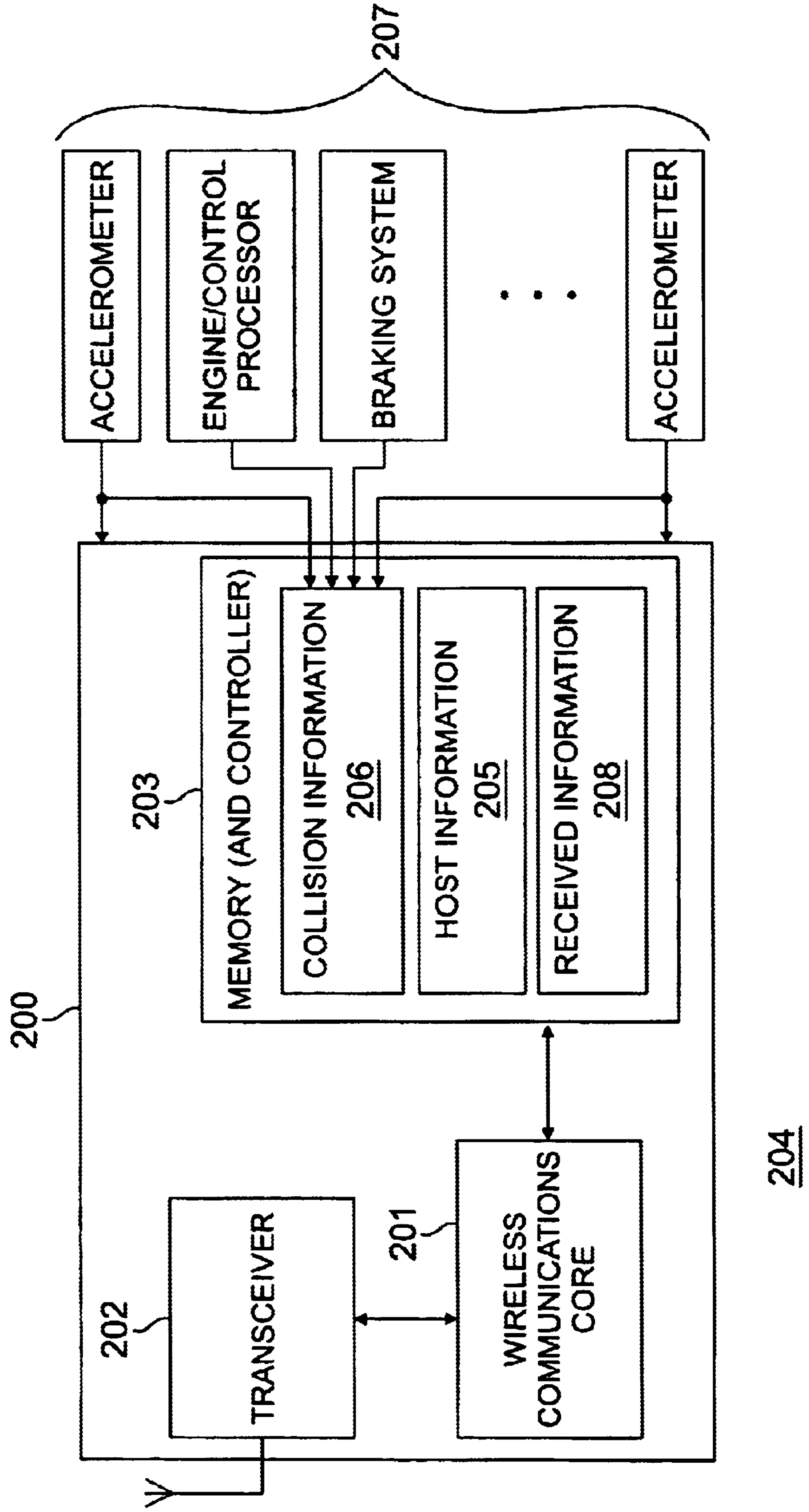
FIG. 2 depicts in greater detail a wireless communications controller for use in a wireless collision information collection and transfer system according to one embodiment of the present invention.
Figure 3:
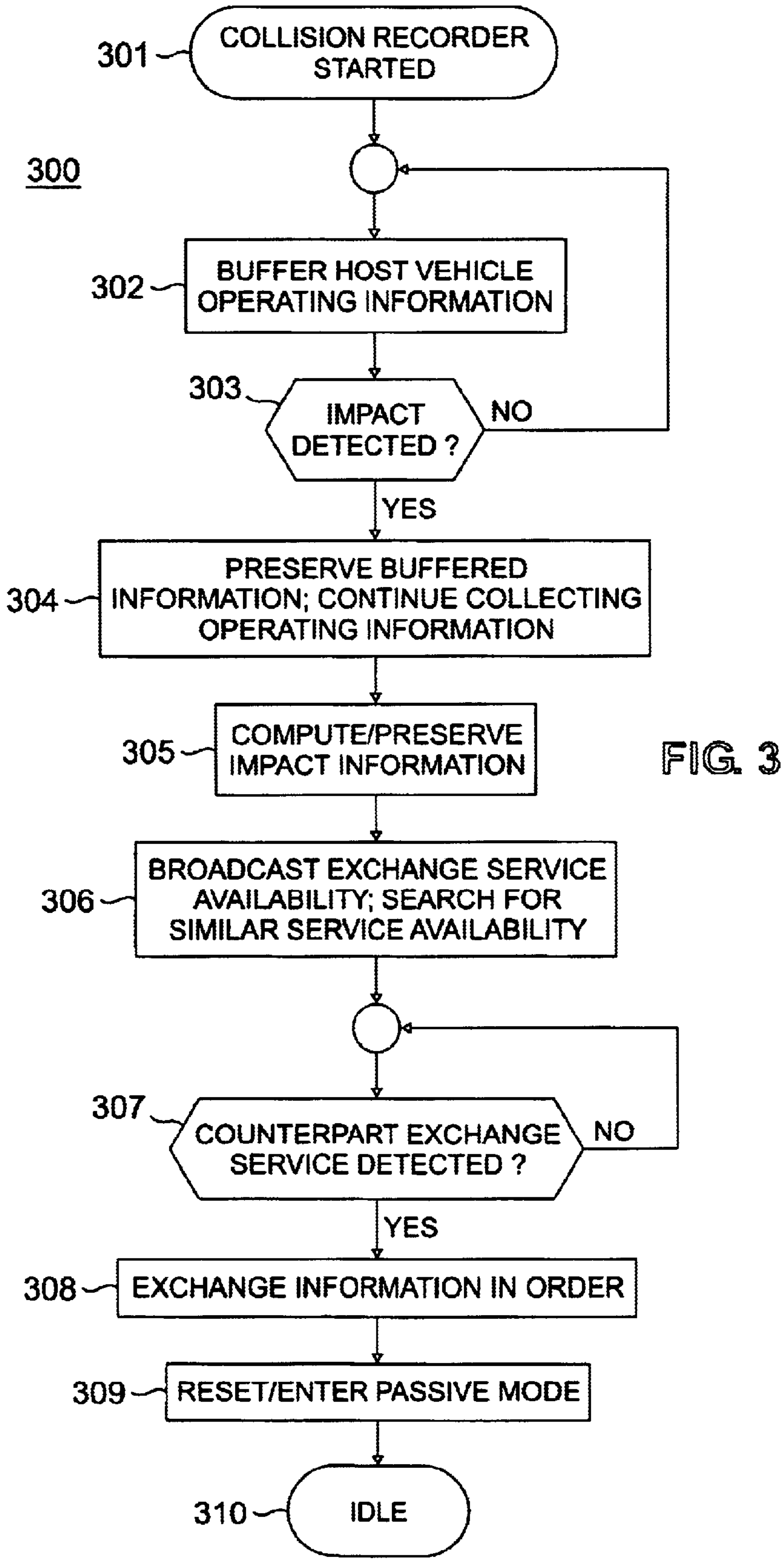
FIG. 3 is a high level flow chart for a process of automated collision information transfer according to one embodiment of the present invention.

FIGS. 1 through 3, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged device.

FIG. 1 depicts a wireless collision information collection and transfer system according to one embodiment of the present invention. In the present invention, wireless collision information collection and transfer system 100 includes a wireless communications controller within at least one vehicle 101–103, preferably within each vehicle, and optionally also within one or more fixed transceivers 104.

FIG. 2 depicts in greater detail a wireless communications controller for use in a wireless collision information collection and transfer system according to one embodiment of the present invention. As noted above, wireless communications controller 200 is preferably implemented in each of vehicles 101–103, and optionally within fixed transceivers 104 as well. Wireless communications controller 200 includes, in the exemplary embodiment, a wireless communications core

201 conforming, for example, to the small area wireless communications protocol defined by the Bluetooth Special Interest Group (SIG) through specifications available at the Bluetooth website. Other wireless communications protocols such as IEEE 802.11 or WLAN may alternatively be implemented within and suitably employed by wireless communications controller 200, which may also contain one or more additional communications cores (not shown) to support more than one wireless communications standard. Bluetooth is preferred since the protocol, although typically used in eliminating cables between discrete pieces of electronic equipment (e.g., computers and cameras, etc.), is well-defined and Bluetooth software and transponding devices are readily available from various sources, resulting in a quick and inexpensive product development cycle and low material costs.

Wireless communications core 201 is coupled to a suitable transceiver 202 and a nonvolatile memory 203. Transceiver 202 may utilize a dedicated antenna or be coupled to another antenna employed by the host vehicle 204 (which may be any of vehicles 101–103 depicted in FIG. 1) for other purposes such as radio reception and/or global positioning satellite (GPS) system signal reception. In the preferred embodiment, transceiver 202 is capable of communication with other wireless devices within a radius of approximately 10 meters.

Nonvolatile (e.g., flash) memory 203 contains "host" information portion 205 regarding the host vehicle 204 such as the vehicle identification number (VIN), license and registration information, and optionally other relevant information such as current ownership, insurance or inspection status information for the host vehicle 204.

A collision information portion 206 of nonvolatile memory 203 is coupled via a memory controller (not depicted separately) to various other systems 207 within the host vehicle 204. Included among the other vehicle systems 207 are one or more accelerometers, preferably at least two accelerometers located, one each, at or near the front and rear of the host vehicle 204. The accelerometers to which wireless communications controller 200 is coupled may be those employed for controlling deployment of one or more airbags within host vehicle 204. Other vehicle systems 207 coupled to collision information portion 206 of nonvolatile memory 203 may include, for example, the host vehicle's on-board computer and/or a GPS receiver.

For security, host information portions 205 of nonvolatile memory 203 may be read or optionally written to (with appropriate access control security and/or encryption) via wireless communications core 201 or other means. Collision information portion 206 is preferably protected and can only be written to by preselected devices 207 to prevent tampering with or falsification of the information therein, although that collision information portion 206 may be read via Wireless communications core 201 or other means. Nonvolatile memory 203 does not require power to maintain the data content therein so that the contents can never be erased without destroying the unit, and is preferably located in a physically inaccessible or difficult to access position within host vehicle 204.

Those skilled in the art will recognize that the full construction and operation of an automobile having a wireless communications controller for wireless collision information collection and transfer according to the present invention is not depicted or described. Instead, only so much of the design and operation of an automobile and wireless communications controller as is unique to the present invention or necessary for an understanding of the present is depicted and described.

In operation, impact is detected by wireless communications controller 200 from signals transmitted by the accelerometers. Any impact, or at least any impact of a predetermined magnitude, triggers the automatic collision information acquisition and transfer process implemented by wireless communications controller 200. Preferably the magnitude of the impact, the direction (from front to rear and across the host vehicle 204), and the point of impact (e.g., from rotational components of acceleration changes) are sensed or computed upon impact, and are stored together with a current date and time within collision information portion 206 of nonvolatile memory 203.

Other information acquired, using sampling methods and a buffer or delay line, by wireless communications controller 200 in response to detecting a collision may include vehicle speed, braking status, seat-belt or other primary restraint status, and GPS coordinates and/or direction of travel, any or all of which may be recorded either instantaneously upon impact or during a predefined capture period including the time of impact, with the information capture period preferably beginning before impact. Wireless communications controller 200 preserves all directly acquired information regarding the detected collision/impact within nonvolatile memory 203.

During a period either following or, preferably, overlapping, the time during which collision information from selected systems 207 is captured by wireless communications controller 200, wireless communications controller 200 in the exemplary embodiment utilizes standard Bluetooth service discovery and communication protocols to determine whether other vehicles in the vicinity (e.g., within 10 meters) contain a counterpart device and, if so, whether such other vehicles also recorded a collision. If a counterpart wireless communications controller in another vehicle within communication range is identified and that vehicle was also recently recorded an impact, wireless communications controller 200 automatically initiates an exchange of at least some—and optionally all—of the information from host and collision information portions 205–206 of nonvolatile memory 203 with the counterpart wireless communications controller. Each wireless communications controller transmits to and receives from the other wireless communications controller(s), either sequentially or consecutively, according to a predefined priority. Collision and host information is exchanged in a predetermined order, preferably beginning with the VIN, between counterpart devices within each vehicle detecting an impact. The VINs of each host vehicle are preferably exchanged first (which may be accomplished in a few seconds) between all accessible wireless communications controllers to provide information for the arrest of hit-and-run drivers. The order of information exchange between one wireless communications controller 200 and each of a plurality of other, counterpart wireless communications controllers within other vehicles may be random, provided each controller completes an information exchange with all other controllers with which communications are established. Information received by wireless communications controller 200 from a counterpart wireless communications controller is stored within received information portion 208 of nonvolatile memory 203.

To insure that captured information is accurately maintained in an accessible location, wireless communications controller 200 may optionally transmit (at least portions of) the information from host and collision information portions 205–206 of nonvolatile memory 203 to counterpart wireless communications controllers for vehicles within range which were not involved in the collision (i.e., vehicles operated by potential eyewitnesses), or to fixed transceivers 104 placed near likely accident scenes (e.g., intersections at which numerous accidents occur annually). Fixed transceivers 104, like information retrieval devices described below, may be essentially identical to the wireless communications controllers 200 as described herein, except collision and host information memory portions are not necessary.

For security purposes, the information transmitted by wireless communications controller 200 to counterpart devices within vehicles not involved in the accident or to fixed transceivers may differ (e.g., as a subset) from the information exchanged between wireless communication devices within vehicles involved in the accident, and/or may have an associated "expiration" period after which the information is deleted by the receiving device. Sensitive or identifying information (within either the collision, host, or received information portions 204–205 and 208) may also be encrypted utilizing encryption keys maintained by, for instance, the insurer of the host vehicle and accessible only to insurance adjusters, police and emergency personnel.

Once collision information is exchanged between wireless communications controllers for vehicles involved in the accident (or other vehicles not involved in any collision, or fixed transceivers), such information is accessible to and may be retrieved by, under appropriate security mechanisms, compatible wireless receiver devices, which may be employed by police or emergency vehicles, insurance adjusters, investigators, and the like. Such compatible wireless retrieval devices may be readily incorporated, for instance, into hand-held radios utilized by police or emergency personnel, or personal digital assistants (PDAs) employed by insurance adjusters. Entirely objective information regarding the collision, collected at or around the time of impact, is thus available to police, insurance companies, and other interested parties. Furthermore, the collision information portion 205 of nonvolatile memory 203 may maintain a running collision history for the host vehicle as a resource for use in connection with resale of "preowned" automobiles.

FIG. 3 is a high level flow chart for a process of automated collision information transfer according to one embodiment of the present invention. The process 300 begins with a collision recorder device adapted for automatic information exchange (e.g., wireless communications controller 200 in FIG. 2) being started (step 301). The collision recorder device may be started each time the host vehicle is started, or may be started once and remain continuously free running thereafter. For power and lifetime considerations, however, the collision recorder device may be started only when the host vehicle leaves a secure location such as the owner's residence, and shut down whenever the host vehicle returns to that secure location. For instance, the collision recorder may operate in conjunction with an automatic garage door opener, and activate from a passive to active mode whenever the vehicle moves out of range (i.e., more than ten meters) of the garage door opener.

While the collision recorded is active, preselected operating information from vehicle sensors or control systems is buffered (step 302). Such information, described above, may include the host vehicle speed, GPS coordinates and direction of travel, braking system and restraint system status, and any other information which might be available and useful in collision reconstruction. The information for a preselected period is preferably buffered on a rolling basis, with the oldest information being overwritten by newest information in a first-in, first-out (FIFO) nonvolatile buffer.

Upon detection of an impact to the host vehicle (step 303), the collision recorder preserves the buffered operating information by storage in a nonvolatile memory (step 304). Host vehicle operating information continues to be collected for at least a predefined period following detection of impact to the host vehicle, and is preserved together with the buffered operating information. The collision recorder may include a self-contained backup power source for performing these functions in the event that the host vehicle primary power system is disabled by the impact.

Also upon detection of the impact to the host vehicle, the collision recorder computes (if necessary) and preserves impact information, such as magnitude and direction of impact and point of impact, if available, from impact sensors such as accelerometers (step 305). Such impact information, together with the preserved operating information, is stored in the collision information portion 206 of the nonvolatile memory 203 for the collision recorder (wireless communications controller 200).

Also upon detection of the impact to the host vehicle, the wireless communications controller begins broadcasting availability of the information exchange service and attempts to detect counterpart wireless communications controller similarly broadcasting availability of such information exchange service (step 306). Broadcasting of the information exchange service availability indicates to other, counterpart wireless communications controllers that the host vehicle was recently subject to an impact (i.e., involved in a collision). To preserve power, broadcast of the information exchange service availability may initially proceed for a predefined period following impact, then be terminated and resumed briefly at periodic intervals until the information within the broadcasting wireless communications controller is retrieved or the broadcasting wireless communications controller is disabled.

Other vehicles involved in the collision and hosting a counterpart wireless communications controller similarly broadcast availability of the information exchange service and, upon detection by each of at least two wireless communications controllers of the service availability broadcast by the other (step 307), an information exchange is initiated (step 308).

If one wireless communications controller detects multiple counterpart wireless communications devices each broadcasting information exchange service availability, information exchange may be initiated in round-robin fashion by the subject wireless communications controllers with each of the counterpart devices in a random order. During initial stages of the information exchange, each wireless communications controller may indicate to the other whether any additional wireless communications controllers are accessible to the first (e.g., by transmitting unique identifiers such as the host vehicle VIN) A wireless communications controller which may communicate with two or more other wireless communications controllers unable to directly communicate with each other may then serve as a conduit for information exchange between the other wireless communications controllers, insuring that all available information is distributed uniformly.

Wireless communications controllers within vehicles not involved in the collision and fixed transceivers may, upon detecting the information exchange service availability broadcast, indicate their availability to receive information from a wireless communications controller within a vehicle involved in the collision. Optionally the fixed transceivers or wireless communications controllers within vehicles not involved in the collision may automatically contact police and/or emergency personnel upon receiving collision information. Wireless communications controller within vehicles involved in the collision should preferably prioritize exchange with wireless communications controllers within other vehicles involved in the collision over those within vehicles not involved in the collision or fixed transceivers.

As described above, information is exchanged between wireless communications controllers in a prescribed order (e.g., starting with the host vehicle VINs). Once the information exchange is complete, the wireless communications controller resets and/or enters a passive mode (step 309) in which information may be retrieved upon request from the wireless communications device. The process then becomes idle until the wireless communications controller (collision recorder) is again started.

The present invention allows information relevant to a collision to be automatically preserved and exchanged between vehicles involved in the collision and/or distributed to other devices within range capable of preserving the information. Objective information captured during the period in which the collision occurs is thus maintained and automatically replicated for availability to police, emergency personnel, insurance representatives, and other interested parties.

It is important to note that while the present invention has been described in the context of a fully functional communications device or system, those skilled in the art will appreciate that the mechanism of the present invention is capable of being implemented and distributed in the form of a computer usable medium of instructions in a variety of forms, and that the present invention applies equally regardless of the particular type of signal bearing medium is used to carry out the distribution. Examples of suitable computer usable mediums include: nonvolatile, hard-coded or programmable type mediums such as read only memories (ROMs) or erasable, electrically programmable read only memories (EEPROMs), recordable type mediums such as floppy disks, hard disk drives, and read/write (R/W) compact disc read only memories (CD-ROMs) or digital versatile discs (DVDs), and transmission type mediums such as digital and analog communications links.

Although the present invention has been described in detail, those skilled in the art will understand that various changes, substitutions, variations, enhancements, nuances, gradations, lesser forms, alterations, revisions, improvements and knock-offs of the invention disclosed herein may be made without departing from the spirit and scope of the invention in its broadest form.

What is claimed is:

1. For use in an automobile, a device for acquiring collision information comprising:

a sensor detecting an impact to a vehicle containing a collision recorder;

a memory containing information relating to at least one of the impact and the vehicle, the memory comprising a first-in, first-out buffer for buffering the information on a rolling basis where newest information replaces oldest information in the buffer; and a wireless communications controller coupled to the sensor and to the memory, wherein the controller, in response to detection of the impact, automatically attempts to establish a wireless communications link to a counterpart wireless communications controller within another vehicle subject to a recent impact by broadcasting availability of an information exchange service by the wireless communications controller, and searching for availability of an information exchange service for the counterpart wireless communications controller, and responsive to successfully establishing a wireless communications link to the counterpart wireless communication controller, exchanges at least a portion of the information within the memory for corresponding information from the counterpart wireless communications controller.

2. The device according to claim 1, wherein the wireless communications controller, in response to detection of the impact, automatically attempts to establish a wireless communications link to counterpart wireless communications controllers within each vehicle in a predefined range which has been subject to a recent impact.

3. The device according to claim 1, wherein the wireless communications controller, responsive to successfully establishing a wireless communications link to a plurality of counterpart wireless communication controllers each within a different vehicle subject to a recent impact, automatically exchanges at least the portion of the information within the memory for corresponding information from each counterpart wireless communications controller.

4. The device according to claim 1, wherein the wireless communications controller attempts to establish a wireless communications link to a counterpart wireless communications controller within another vehicle utilizing Bluetooth wireless communications.

5. The device according to claim 1, wherein the wireless communications controller exchanges at least the portion of the information within the memory for corresponding information from the counterpart wireless communications controller in an ordered sequence beginning with vehicle identification information.

6. The device according to claim 1, wherein the collision recorder, upon detection of the impact to the vehicle containing the collision recorder, preserves the information in the nonvolatile memory for exchange by the wireless communications controller for the corresponding information from the counterpart wireless communications controller information, wherein the information is selected from the group consisting of vehicle speed when the impact to the vehicle containing the collision recorder occurred, location of the vehicle when the impact to the vehicle containing the collision recorder occurred, direction of vehicle travel when the impact to the vehicle containing the collision recorder occurred, impact direction, impact magnitude, and point of impact.

7. The device according to claim 1, wherein the wireless communications controller, responsive to a request from an authorized device establishing a second wireless communications link to the wireless communications controller, transmits at least a portion of the information within the memory to the authorized device.

8. An automobile, comprising:

at least one control system;

a sensor detecting an impact to the automobile;

a nonvolatile memory containing at least one of identification information relating to the automobile and measurement information from the at least one control system captured upon detection of the impact to the automobile; and a wireless communications controller coupled to the sensor and to the memory, wherein the controller, in response to detection of the impact, automatically attempts to establish a wireless communications link to a counterpart wireless communications controller within another vehicle subject to a recent impact, and responsive to successfully establishing a wireless communications link to the counterpart wireless communication controller, exchanges at least a portion of the information within the memory for corresponding information from the counterpart wireless communications controller;

wherein a collision recorder, upon detection of the impact to the vehicle containing the collision recorder, preserves the information in the nonvolatile memory for exchange by the wireless communications controller for the corresponding information from the counterpart wireless communications controller information, and wherein the information is selected from the group consisting of vehicle speed when the impact to the vehicle containing the collision recorder occurred, location of the vehicle when the impact to the vehicle containing the collision recorder occurred, direction of vehicle travel when the impact to the vehicle containing the collision recorder occurred, impact direction, impact magnitude, and point of impact.

9. The automobile according to claim 8, wherein the wireless communications controller, in response to detection of the impact, automatically attempts to establish a wireless communications link to counterpart wireless communications controllers within each vehicle in a predefined range which has been subject to a recent impact.

10. The automobile according to claim 8, wherein the wireless communications controller, responsive to successfully establishing a wireless communications link to a plurality of counterpart wireless communication controllers each within a different vehicle subject to a recent impact, automatically exchanges at least the portion of the information within the memory for corresponding information from each counterpart wireless communications controller.

11. The automobile according to claim 8, wherein the wireless communications controller attempts to establish a wireless communications link to a counterpart wireless communications controller within another vehicle by:

broadcasting availability of an information exchange service by the wireless communications controller, and searching for availability of an information exchange service for the counterpart wireless communications controller.

12. The automobile according to claim 8, wherein the wireless communications controller attempts to establish a wireless communications link to a counterpart wireless communications controller within another vehicle utilizing Bluetooth wireless communications.

13. The automobile according to claim 8, wherein the wireless communications controller exchanges at least the portion of the information within the memory for corresponding information from the counterpart wireless communications controller in an ordered sequence beginning with vehicle identification information.

14. The automobile according to claim 8, wherein the wireless communications controller, responsive to a request from an authorized device establishing a wireless communications link to the wireless communications controller, transmits at least a portion of the information within the memory to the authorized device.

15. A method of acquiring collision information, comprising:

detecting an impact to a vehicle;

responsive to detection of the impact, automatically attempting to establish a wireless communications link between a wireless communications controller coupled to a memory within the vehicle and containing information relating to at least one of the impact and the vehicle and a counterpart wireless communications controller within another vehicle subject to a recent impact; and responsive to successfully establishing a wireless communications link between the wireless communications controller and the counterpart wireless communication controller, exchanging at least a portion of the information within the memory for corresponding information from the counterpart wireless communications controller;

wherein the step of automatically attempting to establish a wireless communications link further comprises:

broadcasting availability of an information exchange service by the wireless communications controller, and searching for availability of an information exchange service for the counterpart wireless communications controller.

16. The method according to claim 15, wherein the step of automatically attempting to establish a wireless communications link further comprises:

attempting to establish a wireless communications link to counterpart wireless communications controllers within each vehicle in a predefined range which has been subject to a recent impact.

17. The method according to claim 15, further comprising:

responsive to successfully establishing a wireless communications link to a plurality of counterpart wireless communication controllers each within a different vehicle subject to a recent impact, exchanging at least the portion of the information within the memory for corresponding information from each counterpart wireless communications controller.

18. The method according to claim 15, wherein the step of automatically attempting to establish a wireless communications link further comprises:

utilizing Bluetooth wireless communications.

19. The method according to claim 15, wherein the step of exchanging at least a portion of the information within the memory for corresponding information from the counterpart wireless communications controller further comprises:

exchanging the portion of the information within the memory for corresponding information from the counterpart wireless communications controller in an ordered sequence beginning with vehicle identification information.

20. The method according to claim 15, further comprising:

responsive to a request from an authorized device establishing a wireless communications link to the wireless communications controller, transmitting at least a portion of the information within the memory to the authorized device.

* * * * *